(12) United States Patent
Bangera et al.

(10) Patent No.: US 12,079,243 B2
(45) Date of Patent: Sep. 3, 2024

(54) SYSTEM AND METHOD FOR DATA TRANSMISSION FROM MAINFRAME DATABASE TO LOG DATABASE

(71) Applicant: JPMorgan Chase Bank, N.A., New York, NY (US)

(72) Inventors: Praveen Bangera, Bangalore (IN); Harishkumar Lakshminarasimhamurthy, Bangalore (IN); Suhas Mathakari, Bangalore (IN); Ramgopal Reddy Gonnuru, Bangalore (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 129 days.

(21) Appl. No.: 17/644,176

(22) Filed: Dec. 14, 2021

(65) Prior Publication Data

US 2023/0139224 A1 May 4, 2023

(30) Foreign Application Priority Data

Oct. 29, 2021 (IN) .............................. 202111049600

(51) Int. Cl.
*G06F 16/00* (2019.01)
*G06F 16/11* (2019.01)
(Continued)

(52) U.S. Cl.
CPC .......... *G06F 16/273* (2019.01); *G06F 16/116* (2019.01); *G06F 16/2379* (2019.01)

(58) Field of Classification Search
CPC ... G06F 16/273; G06F 16/2379; G06F 16/116
See application file for complete search history.

(56) References Cited

U.S. PATENT DOCUMENTS

| 8,930,380 | B1 * | 1/2015 | Saurabh | ............ G06F 16/24534 |
| | | | | 707/811 |
| 9,311,387 | B1 * | 4/2016 | Saurabh | ............ G06F 16/24534 |
| | | (Continued) | | |

FOREIGN PATENT DOCUMENTS

WO WO2013168362 * 9/2023

OTHER PUBLICATIONS

Miller et al., Using Shared Arrays in Message-Driven Parallel Programs; IEEE 2011.*

*Primary Examiner* — Daniel A Kuddus
(74) *Attorney, Agent, or Firm* — GREENBLUM & BERNSTEIN, P.L.C.

(57) ABSTRACT

Various methods, apparatuses/systems, and media for data transmission are disclosed. A processor accesses a database that stores data relating to one or more transactions; implements a replication tool that is configured for a table within the table. When a row is added to the table or modified in the table, the replication tool identifies the added or modified row. The processor publishes, by utilizing the replication tool, the data associated with the added or modified row onto a local message queue (MQ); reads the published data from the local MQ; converts the data into a configuration file having a predefined file format; parses the data from the configuration file; creates a predefined payload based on the parsed data; and transmits the predefined payload onto a log database via a data bus.

20 Claims, 10 Drawing Sheets

(51) Int. Cl.
    *G06F 16/23*         (2019.01)
    *G06F 16/27*         (2019.01)

(56) References Cited

U.S. PATENT DOCUMENTS

| | | | |
|---|---|---|---|
| 9,479,385 B1* | 10/2016 | Bhave | H04L 43/04 |
| 10,180,971 B2* | 1/2019 | Bhave | G06F 16/86 |
| 10,908,977 B1* | 2/2021 | Ferstay | G06F 11/3476 |
| 11,615,082 B1* | 3/2023 | Shrigondekar | G06F 16/245 |
| | | | 707/769 |
| 2005/0044197 A1* | 2/2005 | Lai | H04L 67/02 |
| | | | 709/223 |
| 2007/0039049 A1* | 2/2007 | Kupferman | H04L 63/1416 |
| | | | 726/22 |
| 2015/0188415 A1* | 7/2015 | Abido | G06N 3/043 |
| | | | 307/103 |
| 2015/0199415 A1* | 7/2015 | Bourbonnais | G06F 16/27 |
| | | | 707/615 |
| 2016/0226944 A1* | 8/2016 | Hsiao | H04L 69/22 |
| 2018/0338002 A1* | 11/2018 | Sherrill | G06F 16/88 |
| 2019/0012352 A1* | 1/2019 | Bhave | H04L 67/025 |
| 2019/0205327 A1* | 7/2019 | Bhave | G06F 11/3072 |
| 2020/0334134 A1* | 10/2020 | Kalyanaraman | G06F 11/3688 |
| 2021/0149751 A1* | 5/2021 | Ferstay | G06F 9/4881 |
| 2022/0256017 A1* | 8/2022 | Friedman | H04L 69/22 |

\* cited by examiner

FIG. 7A

| Name ▲ | Operating system | Virtualization | CPU usage | Memory usage | Disk latency | Network traffic |
|---|---|---|---|---|---|---|
| Example1 | OS | Virtual Machine | 1.09 % | 23 % of 5.03 GB | - | 793 kbit/s |
| Example2 | OS | Virtual Machine | 1.01 % | 23 % of 5.03 GB | - | 794 kbit/s |

2 Hosts

700

SYSTEM AND METHOD FOR DATA TRANSMISSION FROM MAINFRAME DATABASE TO LOG DATABASE

CROSS-REFERENCE TO RELATED APPLICATIONS

This application claims the benefit of priority from Indian Provisional Patent Application No. 202111049600, filed Oct. 29, 2021, which is herein incorporated by reference in its entirety.

TECHNICAL FIELD

This disclosure generally relates to data transmission, and, more particularly, to methods and apparatuses for implementing a platform and language agnostic modular data transmission module for transmitting near real-time data from mainframe onto a distributed environment without compromising performance on mainframe.

BACKGROUND

The developments described in this section are known to the inventors. However, unless otherwise indicated, it should not be assumed that any of the developments described in this section qualify as prior art merely by virtue of their inclusion in this section, or that these developments are known to a person of ordinary skill in the art.

Today, network-based online payments have become prevalent in the online community, taking advantage of the Internet's worldwide connectivity in order to connect a large collection of market participants. Electronic payment may be conducted in the same fashion as regular commerce, except that buyers and sellers do not meet face to face. Therefore, the arranging for payment must be done online via an application.

Conventional payment applications typically run on various platforms, e.g., servers, data repositories, private or public clouds, etc. It is a critical application for large organizations because such applications may process over four trillion dollars' worth of payments ($4 trillion) in a given day. As such, even a few minutes of downtime or slowness may result in billions of dollars of payments being stuck. Currently, there is no real-time dashboard that could provide throughput details and product level breakups for transactions in near real-time (i.e., less than a second). Moreover, conventional monitoring dashboard lacks the capabilities of providing accurate historical statistics of transactions data so that it can be compared with current statistics of transactions data. Conventional visualization tool (i.e., graphical user interface) may provide some level of historical statistics of transactions data. However, since this data are being stored on a mainframe, this conventional visualization tool lacks the capabilities of transmitting near real-time data onto a distributed environment without compromising performance on the mainframe.

Therefore, there is a need for an advanced tool that can address these conventional shortcomings.

SUMMARY

The present disclosure, through one or more of its various aspects, embodiments, and/or specific features or sub-components, provides, among other features, various systems, servers, devices, methods, media, programs, and platforms for implementing a platform and language agnostic modular data transmission module for transmitting near real-time data from mainframe onto a distributed environment without compromising performance on mainframe, but the disclosure is not limited thereto.

For example, the various aspects, embodiments, features, and/or sub-components may also provide optimized processes of implementing a platform and language agnostic modular data transmission module that is configured to: provide a real-time dashboard that provides throughput details and product level breakups of transactions data; provide no impact to performance on mainframe as Q replication (i.e., QREP: a high performance log capture/transaction-replay replication technology) works against logs; allow retention of data on a log database for many days compared to mainframe; require no login to mainframe thereby not exposing the application for performance metrics purpose; allow services to be run on cloud thereby eliminating internal data storage requirements and improving storage capacities of internal systems; provide scalability and reusability of data across multiple line of businesses (LOBs); provide rich data graphics compared to mainframe; allow near real-time data transmission (i.e., less than a second, but the disclosure is not limited thereto) without impacting system performance; in a case when service is down, configure the QREP in a manner to stop writing to message queue (MQ) to avoid MQ full; decouple of data with presentation layer thereby allowing quicker time of market as changes can be pushed in distributed platforms quicker than mainframe, etc., but the disclosure is not limited thereto.

The configuration/data files, according to exemplary embodiments, may be written using JSON (Java Script Object Notation), but the disclosure is not limited thereto. For example, the configuration/data files can easily be extended to other readable file formats such as XML, YAML, etc., or any other configuration based languages.

According to an aspect of the present disclosure, a method for data transmission by utilizing one or more processors along with allocated memory is disclosed. The method may include: accessing a database that stores data relating to one or more transactions; implementing a replication tool that is configured for a table within the database, and when a row is added to the table or modified in the table, the replication tool is configured to identify the added or modified row; publishing, by utilizing the replication tool, the data associated with the added or modified row onto a local message queue (MQ); reading the published data from the local MQ; converting the data into a configuration file having a predefined file format; parsing the data from the configuration file; creating a predefined payload based on the parsed data; and transmitting the predefined payload onto a log database via a data bus.

According to a further aspect of the present disclosure, the predefined payload may refer to JSON-formatted text data that is either posted (e.g., via an HTTP POST) to a web service when a user creates a resource or returned from a web service (e.g., via an HTTP GET) when a user requests a resource (or resources), but the disclosure is not limited thereto.

According to yet another aspect of the instant disclosure, the database may be a set of mainframe relational databases that enable creation of declarative data models corresponding to the one or more transactions, wherein the declarative data models are accessible via queries.

According to a further aspect of the instant disclosure, the local MQ may be a mainframe local MQ, and in publishing the transaction details data onto the mainframe local MQ, the method may further include: writing required columns to the mainframe local MQ in response to the added or modified row; and configuring the replication tool and the mainframe local MQ in a manner such that writing the required columns does not impact performance of mainframe database as the replication tool works against logs only.

According to an additional aspect of the instant disclosure, the method may further include converting the data into an XML (Extensible Markup Language) file format, but the disclosure is not limited thereto.

According to yet another aspect of the instant disclosure, the data may correspond to transaction details data associated with the one or more transactions, but the disclosure is not limited thereto.

According to yet another aspect of the instant disclosure, the transaction details data may include data associated with the one or more financial transactions, but the disclosure is not limited thereto.

According to another aspect of the instant disclosure, in creating the predefined payload, the method may further include implementing data mapping algorithm to create user format JSON; and creating JSON payload utilizing the data mapping algorithm, but the disclosure is not limited thereto.

According to yet another aspect of the instant disclosure, in transmitting the predefined payload onto the log database, the method may further include logging onto a cloud application platform; deploying the JSON payload onto the cloud; and transmitting, by utilizing a log service drainer, the JSON payload from the cloud to the log database via a data bus for consuming by a distributed platform.

According to another aspect of the present disclosure, the cloud application platform may be a private cloud application platform for deploying the JSON payload onto a private cloud, or a public cloud application platform for deploying the JSON payload onto a public cloud, but the disclosure is not limited thereto.

According to a further aspect of the instant disclosure, the method may further include creating real-time graphs based on the JSON payload obtained from the log database; and displaying the real-time graphs onto a display.

According to another aspect of the instant disclosure, the method may further include creating log analytics data to monitor throughput of transactions journey from start to complete of the one or more transactions in real time.

According to yet another aspect of the instant disclosure, the method may further include analyzing the log analytics data; generating alerts data based on analyzing the log analytics data; and transmitting the alters data to a user computing device for taking remedial actions in correspondence with the alters data.

According to a further aspect of the present disclosure, the alerts data may include data related to important transactions data to be utilized for making informed financial decisions, but the disclosure is not limited thereto. For example, alerts data displayed on the user computing device may notify the user of key business/financial events that the user cannot afford to miss, thereby helping the user quickly making informed business/financial decisions.

According to an aspect of the present disclosure, a system for data transmission is disclosed. The system may include: a processor; and a memory operatively connected to the processor via a communication interface, the memory storing computer readable instructions, when executed, may cause the processor to: access a database that stores data relating to one or more transactions; implement a replication tool that is configured for a table within the database, and when a row is added to the table or modified in the table, the replication tool is configured to identify the added or modified row; publish, by utilizing the replication tool, the data associated with the added or modified row onto a local message queue (MQ); read the published data from the local MQ; convert the data into a configuration file having a predefined file format; parse the data from the configuration file; create a predefined payload based on the parsed data; and transmit the predefined payload onto a log database via a data bus.

According to a further aspect of the instant disclosure, the local MQ may be a mainframe local MQ, and in publishing the transaction details data onto the mainframe local MQ, the processor may be further configured to: write required columns to the mainframe local MQ in response to the added or modified row; and configure the replication tool and the mainframe local MQ in a manner such that writing the required columns does not impact performance of mainframe database as the replication tool works against logs only.

According to an additional aspect of the instant disclosure the processor may be further configured to: convert the data into an XML (Extensible Markup Language) file format.

According to another aspect of the instant disclosure, in creating the predefined payload, the processor may be further configured to implement data mapping algorithm to create user format JSON; and create JSON payload utilizing the data mapping algorithm, but the disclosure is not limited thereto.

According to yet another aspect of the instant disclosure, in transmitting the predefined payload onto the log database, the processor may be further configured to log onto a private cloud application platform; deploy the JSON payload onto the private cloud; and transmit, by utilizing a log service drainer, the JSON payload from the private cloud to the log database via a data bus for consuming by a distributed platform.

According to a further aspect of the instant disclosure, the processor may be further configured to create real-time graphs based on the JSON payload obtained from the log database; and display the real-time graphs onto a display.

According to another aspect of the instant disclosure, the processor may be further configured to create log analytics data to monitor throughput of transactions journey from start to complete of the one or more transactions in real time.

According to yet another aspect of the instant disclosure, the processor may be further configured to analyze the log analytics data; generate alerts data based on analyzing the log analytics data; and transmit the alters data to a user computing device for taking remedial actions in correspondence with the alters data.

According to an aspect of the present disclosure, a non-transitory computer readable medium configured to store instructions for data transmission is disclosed. The instructions, when executed, may cause a processor to perform the following: accessing a database that stores data relating to one or more transactions; implementing a replication tool that is configured for a table within the database, and when a row is added to the table or modified in the table, the replication tool is configured to identify the added or modified row; publishing, by utilizing the replication tool, the data associated with the added or modified row onto a local message queue (MQ); reading the published data from the local MQ; converting the data into a configuration file having a predefined file format; parsing the data from the configuration file; creating a predefined payload based on the parsed data; and transmitting the predefined payload onto a log database via a data bus.

According to a further aspect of the instant disclosure, in publishing the transaction details data onto the mainframe local MQ, the instructions, when executed, may cause a processor to perform the following: writing required columns to the mainframe local MQ in response to the added or modified row; and configuring the replication tool and the mainframe local MQ in a manner such that writing the required columns does not impact performance of mainframe database as the replication tool works against logs only.

According to an additional aspect of the instant disclosure, the instructions, when executed, may cause a processor to perform the following: converting the data into an XML (Extensible Markup Language) file format, but the disclosure is not limited thereto.

According to another aspect of the instant disclosure, in creating the predefined payload, the instructions, when executed, may cause a processor to perform the following: implementing data mapping algorithm to create user format JSON; and creating JSON payload utilizing the data mapping algorithm, but the disclosure is not limited thereto.

According to yet another aspect of the instant disclosure, in transmitting the predefined payload onto the log database, the instructions, when executed, may cause a processor to perform the following: logging onto a private cloud application platform; deploying the JSON payload onto the private cloud; and transmitting, by utilizing a log service drainer, the JSON payload from the private cloud to the log database via a data bus for consuming by a distributed platform.

According to a further aspect of the instant disclosure, the instructions, when executed, may cause a processor to perform the following: creating real-time graphs based on the JSON payload obtained from the log database; and displaying the real-time graphs onto a display.

According to another aspect of the instant disclosure, the instructions, when executed, may cause a processor to perform the following: creating log analytics data to monitor throughput of transactions journey from start to complete of the one or more transactions in real time.

According to yet another aspect of the instant disclosure, the instructions, when executed, may cause a processor to perform the following: analyzing the log analytics data; generating alerts data based on analyzing the log analytics data; and transmitting the alters data to a user computing device for taking remedial actions in correspondence with the alters data.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. 7A, 7B, and 7C, in combination illustrate an exemplary monitoring screen implemented by the platform and language agnostic modular data transmission module of FIG. 4 in accordance with an exemplary embodiment.

DETAILED DESCRIPTION

Figure 1:
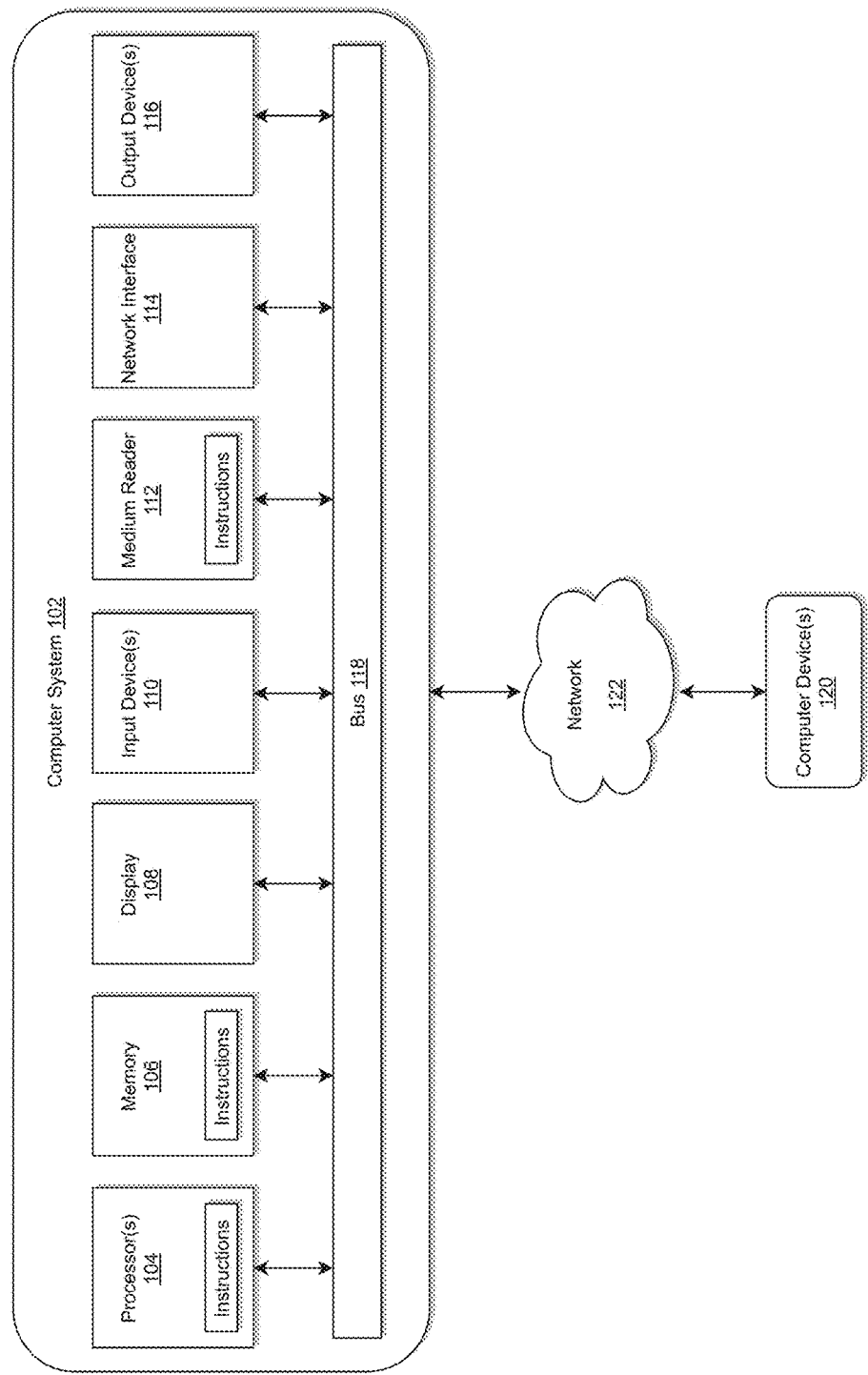
FIG. 1 illustrates a computer system for implementing a platform and language agnostic modular data transmission module for transmitting near real-time data from mainframe onto a distributed environment without compromising on performance on mainframe in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in implementing a platform and language agnostic modular data transmission module for transmitting near real-time data from mainframe onto a distributed environment without compromising on performance on mainframe in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
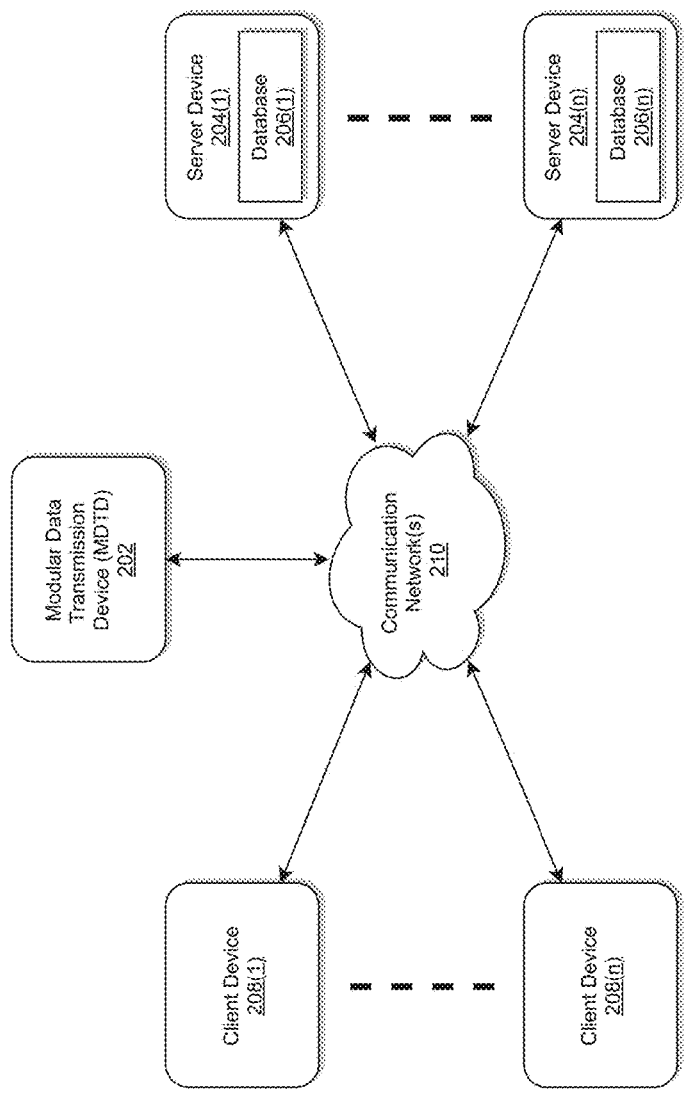
FIG. 2 illustrates an exemplary diagram of a network environment with a platform and language agnostic modular data transmission device in accordance with an exemplary embodiment.

Referring to FIG. 2, a schematic of an exemplary network environment 200 for implementing a platform and language agnostic modular data transmission device (MDTD) of the instant disclosure is illustrated.

According to exemplary embodiments, the above-described problems associated with conventional approach of upgrading software application may be overcome by implementing a MDTD 202 as illustrated in FIG. 2 that may transmit near real-time data from mainframe onto a distributed environment without compromising on performance on mainframe, but the disclosure is not limited thereto. For example, the MDTD 202 may also provide optimized processes to implement a platform and language agnostic modular data transmission module that is configured to: provide a real-time dashboard monitor that provides throughput details and product level breakups of transactions data; provide no impact to performance on mainframe as Q replication (i.e., QREP: a high performance log capture/transaction-replay replication technology) works against logs; allow retention of data on a log database for many days compared to mainframe; require no login to mainframe thereby not exposing the application for performance metrics purpose; allow services to be run on cloud thereby eliminating internal data storage requirements and improving storage capacities of internal systems; provide scalability and reusability of data across multiple line of businesses (LOBs); provide rich data graphics compared to mainframe; allow near real-time data transmission (i.e., less than a second, but the disclosure is not limited thereto) without impacting system performance; in a case when service is down, configure the QREP in a manner to stop writing to message queue (MQ) to avoid MQ full; decouple of data with presentation layer thereby allowing quicker time of market as changes can be pushed in distributed platforms quicker than mainframe, etc., but the disclosure is not limited thereto.

The MDTD 202 may be the same or similar to the computer system 102 as described with respect to FIG. 1.

The MDTD 202 may store one or more applications that can include executable instructions that, when executed by the MDTD 202, cause the MDTD 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the MDTD 202 itself, may be located in virtual server(s) running in a cloud-based computing environment rather than being tied to one or more specific physical network computing devices. Also, the application(s) may be running in one or more virtual machines (VMs) executing on the MDTD 202. Additionally, in one or more embodiments of this technology, virtual machine(s) running on the MDTD 202 may be managed or supervised by a hypervisor.

In the network environment 200 of FIG. 2, the MDTD 202 is coupled to a plurality of server devices 204(1)-204(n) that hosts a plurality of databases 206(1)-206(n), and also to a plurality of client devices 208(1)-208(n) via communication network(s) 210. A communication interface of the MDTD 202, such as the network interface 114 of the computer system 102 of FIG. 1, operatively couples and communicates between the MDTD 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the MDTD 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The MDTD 202 may be a standalone device or integrated with one or more other devices or apparatuses, such as one or more of the server devices 204(1)-204(n), for example. In one particular example, the MDTD 202 may be hosted by one of the server devices 204(1)-204(n), and other arrangements are also possible. Moreover, one or more of the devices of the MDTD 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the MDTD 202 via the communication network(s) 210 according to the HTTP-based and/or JSON protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the MDTD 202 that may efficiently provide a platform for implementing a platform and language agnostic modular data transmission module for transmitting near real-time data from mainframe onto a distributed environment without compromising on performance on mainframe, but the disclosure is not limited thereto. For example, the client devices 208(1)-208(n) in this example may include any type of computing device that can facilitate the implementation of the MDTD 202 that provide optimized processes of implementing a platform and language agnostic modular data transmission module that is configured to: provide a real-time dashboard monitor that provides throughput details and product level breakups of transactions data; provide no impact to performance on mainframe as Q replication (i.e., QREP: a high performance log capture/transaction-replay replication technology) works against logs; allow retention of data on a log database for many days compared to mainframe; require no login to mainframe thereby not exposing the application for performance metrics purpose; allow services to be run on cloud thereby eliminating internal data storage requirements and improving storage capacities of internal systems; provide scalability and reusability of data across multiple line of businesses (LOBs); provide rich data graphics compared to mainframe; allow near real-time data transmission (i.e., less than a second, but the disclosure is not limited thereto) without impacting system performance; in a case when service is down, configure the QREP in a manner to stop writing to message queue (MQ) to avoid MQ full; decouple of data with presentation layer thereby allowing quicker time of market as changes can be pushed in distributed platforms quicker than mainframe, etc., but the disclosure is not limited thereto.

The client devices 208(1)-208(n) may run interface applications, such as standard web browsers or standalone client applications, which may provide an interface to communicate with the MDTD 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the MDTD 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the MDTD 202, the server devices 204(1)-204(n), or the client devices 208(1)-208(n), for example, may be configured to operate as virtual instances on the same physical machine. For example, one or more of the MDTD 202, the server devices 204(1)-204(n), or the client devices 208(1)-208(n) may operate on the same physical device rather than as separate devices communicating through communication network(s) 210. Additionally, there may be more or fewer MDTDs 202, server devices 204(1)-204(n), or client devices 208(1)-208(n) than illustrated in FIG. 2. According to exemplary embodiments, the MDTD 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
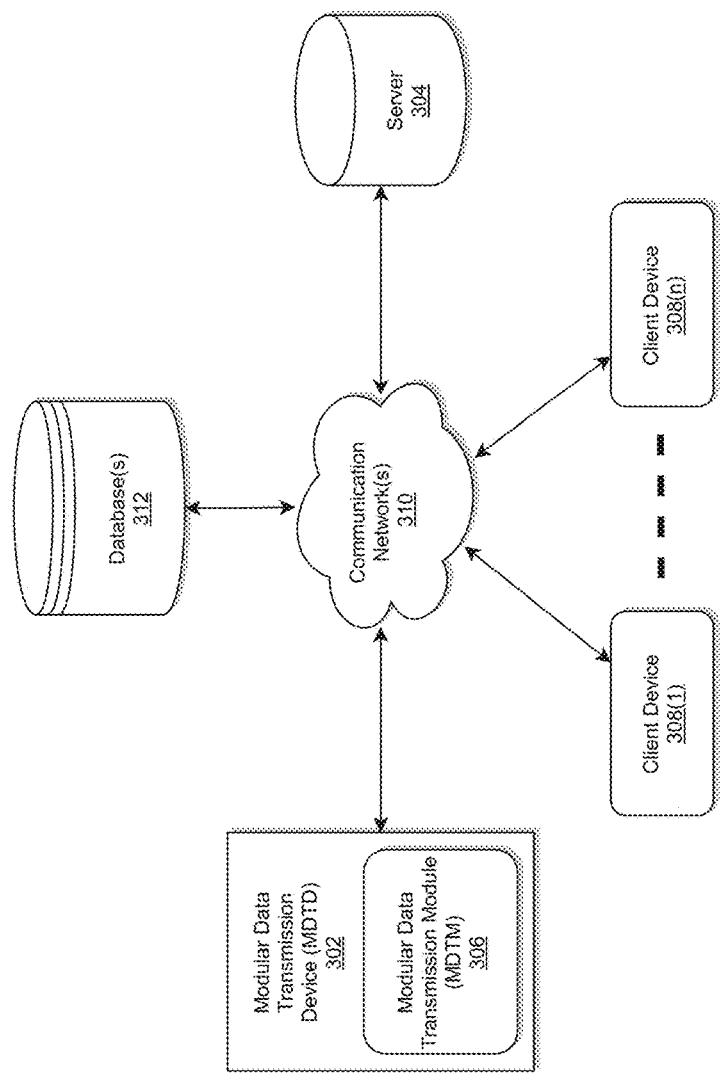
FIG. 3 illustrates a system diagram for implementing a platform and language agnostic modular data transmission device having a platform and language agnostic modular data transmission module in accordance with an exemplary embodiment.

FIG. 3 illustrates a system diagram for implementing a platform and language agnostic modular data transmission device (MDTD) having a platform and language agnostic modular data transmission module (MDTM) in accordance with an exemplary embodiment.

As illustrated in FIG. 3, the system 300 may include a MDTD 302 within which a MDTM 306 is embedded, a server 304, a database(s) 312, a plurality of client devices 308(1) . . . 308(n), and a communication network 310.

According to exemplary embodiments, the MDTD 302 including the MDTM 306 may be connected to the server 304, and the database(s) 312 via the communication network 310. The MDTD 302 may also be connected to the plurality of client devices 308(1) 308(n) via the communication network 310, but the disclosure is not limited thereto.

According to exemplary embodiment, the MDTD 302 is described and shown in FIG. 3 as including the MDTM 306, although it may include other rules, policies, modules, databases, or applications, for example. According to exemplary embodiments, the database(s) 312 may be configured to store ready to use modules written for each API for all environments. Although only one database is illustrated in FIG. 3, the disclosure is not limited thereto. Any number of desired databases may be utilized for use in the disclosed invention herein. The database(s) may be a mainframe database (e.g., IBM® DB2 Database), a log database (i.e., Splunk) that may that may produce programming for searching, monitoring, and analyzing machine-generated data via a Web-style interface, etc., but the disclosure is not limited thereto.

According to exemplary embodiments, the MDTM 306 may be configured to receive real-time feed of data from the plurality of client devices 308(1) . . . 308(n) via the communication network 310.

As will be described below, the MDTM 306 may be configured to access a mainframe database that stores data relating to one or more transactions onto a table in a compressed format; implement a replication tool that is configured for the table, and when a row is added to the table or modified in the table, the replication tool is configured to identify the added or modified row; publish, by utilizing the replication tool, the data associated with the added or modified row onto a mainframe local message queue (MQ); read the published data from the mainframe local MQ; convert the data into a configuration file having a predefined file format; parse the data from the configuration file; create a predefined payload based on the parsed data; and transmit the predefined payload onto a log database via a data bus, but the disclosure is not limited thereto.

The plurality of client devices 308(1) . . . 308(n) are illustrated as being in communication with the MDTD 302. In this regard, the plurality of client devices 308(1) . . . 308(n) may be "clients" of the MDTD 302 and are described herein as such. Nevertheless, it is to be known and understood that the plurality of client devices 308(1) . . . 308(n) need not necessarily be "clients" of the MDTD 302, or any entity described in association therewith herein. Any additional or alternative relationship may exist between either or both of the plurality of client devices 308(1) . . . 308(n) and the MDTD 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the MDTD 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The MDTD 302 may be the same or similar to the MDTD 202 as described with respect to FIG. 2, including any features or combination of features described with respect thereto.

Figure 4:
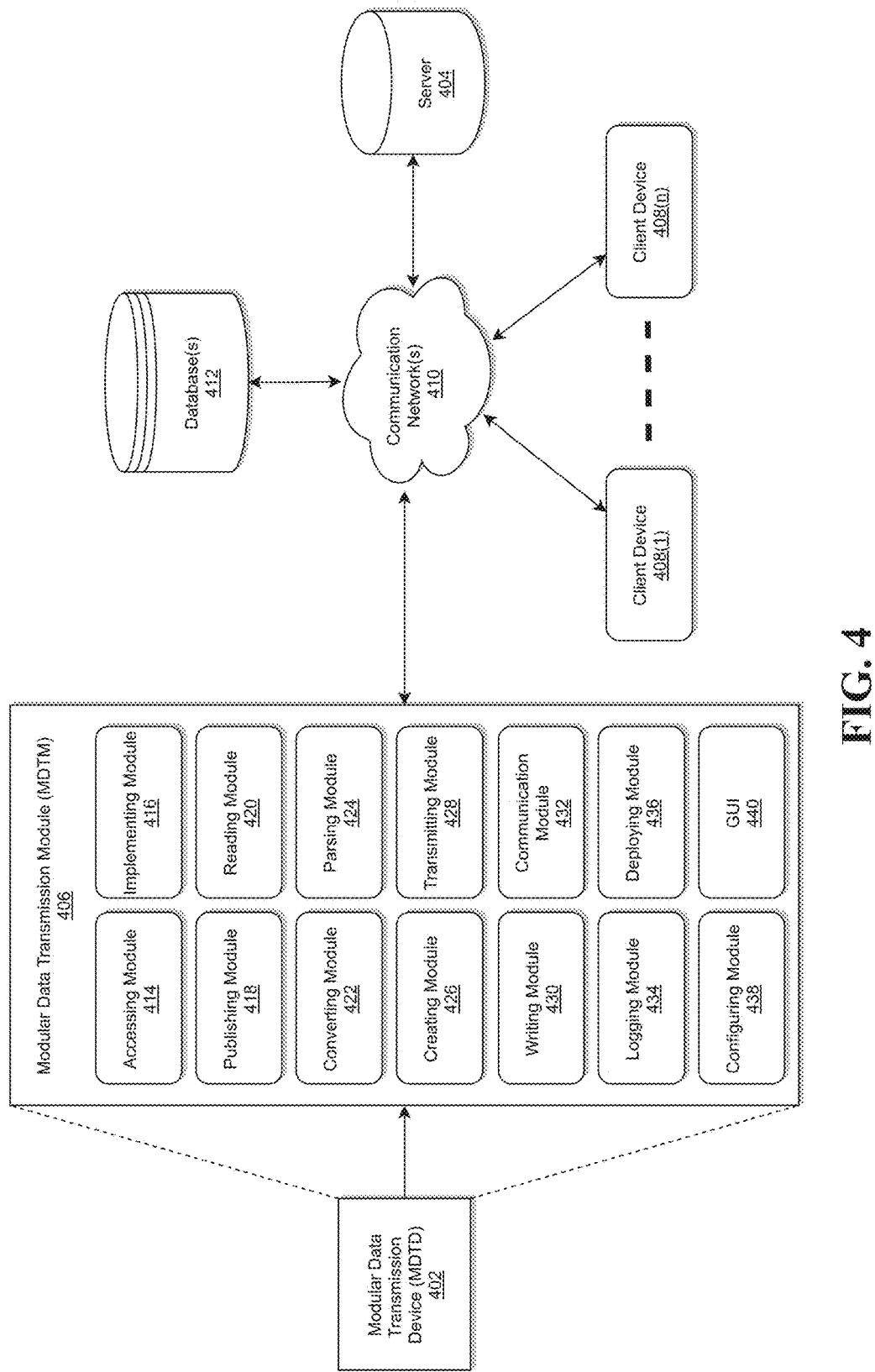
FIG. 4 illustrates a system diagram for implementing a platform and language agnostic modular data transmission module of FIG. 3 in accordance with an exemplary embodiment.

FIG. 4 illustrates a system diagram for implementing a platform and language agnostic modular data transmission module (MDTM) of FIG. 3 in accordance with an exemplary embodiment.

According to exemplary embodiments, the system 400 may include a platform and language agnostic modular data transmission device (MDTD) 402 within which an MDTM 406 is embedded, a server 404, database(s) 412, and a communication network 410.

According to exemplary embodiments, the MDTD 402 including the MDTM 406 may be connected to the server 404 and the database(s) 412 via the communication network 410. The MDTD 402 may also be connected to the plurality of client devices 408(1)-408(n) via the communication network 410, but the disclosure is not limited thereto. The MDTM 406, the server 404, the plurality of client devices 408(1)-408(n), the database(s) 412, the communication network 410 as illustrated in FIG. 4 may be the same or similar to the MDTM 306, the server 304, the plurality of client devices 308(1)-308(n), the database(s) 312, the communication network 310, respectively, as illustrated in FIG. 3.

According to exemplary embodiments, as illustrated in FIG. 4, the MDTM 406 may include an accessing module 414, an implementing module 416, a publishing module 418, a reading module 420, a converting module 422, a parsing module 424, a creating module 426, a transmitting module 428, a writing module 430, a communication module 432, a logging module 434, a deploying module 436, a configuring module 438, and a GUI 440.

According to exemplary embodiments, each of the accessing module 414, implementing module 416, publishing module 418, reading module 420, converting module 422, parsing module 424, creating module 426, transmitting module 428, writing module 430, communication module 432, logging module 434, deploying module 436, and configuring module 438 of the MDTM 406 may be physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies.

According to exemplary embodiments, each of the accessing module 414, implementing module 416, publishing module 418, reading module 420, converting module 422, parsing module 424, creating module 426, transmitting module 428, writing module 430, communication module 432, logging module 434, deploying module 436, and configuring module 438 of the MDTM 406 may be implemented by microprocessors or similar, and may be programmed using software (e.g., microcode) to perform various functions discussed herein and may optionally be driven by firmware and/or software.

Alternatively, according to exemplary embodiments, each of the accessing module 414, implementing module 416, publishing module 418, reading module 420, converting module 422, parsing module 424, creating module 426, transmitting module 428, writing module 430, communication module 432, logging module 434, deploying module 436, and configuring module 438 of the MDTM 406 may be implemented by dedicated hardware, or as a combination of dedicated hardware to perform some functions and a processor (e.g., one or more programmed microprocessors and associated circuitry) to perform other functions.

According to exemplary embodiments, each of the accessing module 414, implementing module 416, publishing module 418, reading module 420, converting module 422, parsing module 424, creating module 426, transmitting module 428, writing module 430, communication module 432, logging module 434, deploying module 436, and configuring module 438 of the MDTM 406 may be called via corresponding API.

The process may be executed via the communication module 432 and the communication network 410, which may comprise plural networks as described above. For example, in an exemplary embodiment, the various components of the MDTM 406 may communicate with the server 404, and the database(s) 412 via the communication module 432 and the communication network 410. Of course, these embodiments are merely exemplary and are not limiting or exhaustive.

According to exemplary embodiments, the communication network 410 and the communication module 432 may be configured to establish a link between the database(s) 412, the client devices 408(1)-408(n) and the MDTM 406, 506.

Figure 5:
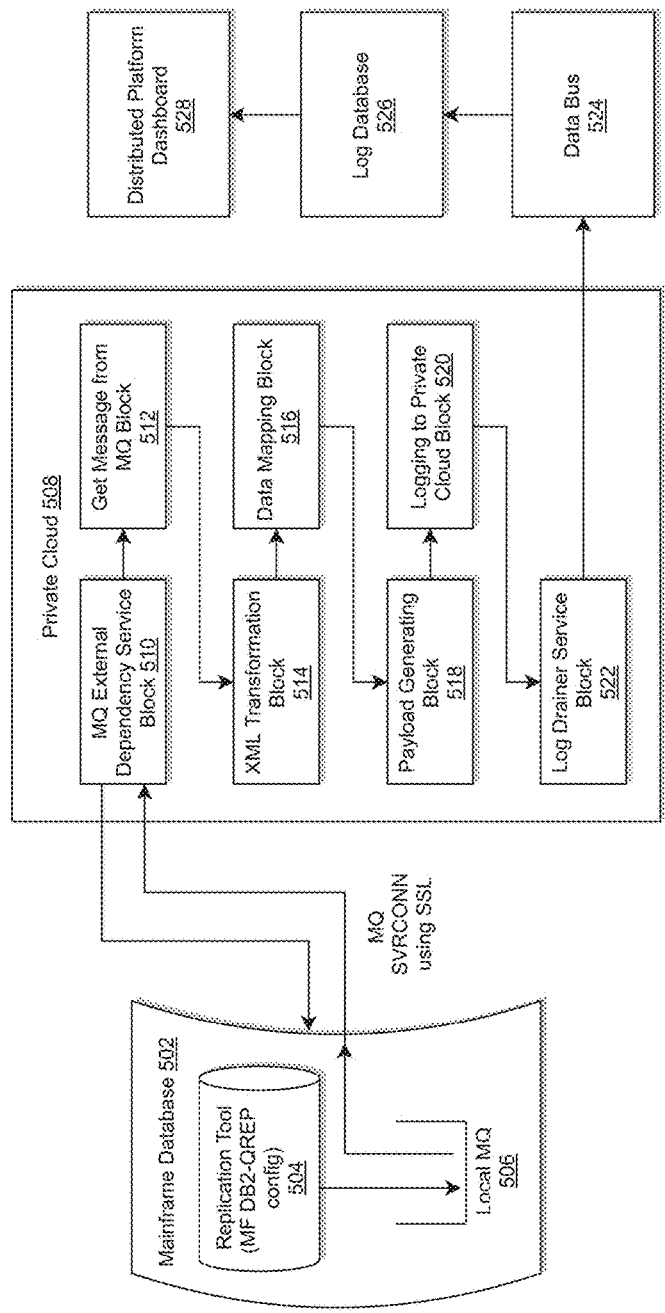
FIG. 5 illustrates an exemplary architecture implemented by the platform and language agnostic modular data transmission module of FIG. 4 in accordance with an exemplary embodiment.

FIG. 5 illustrates an exemplary architecture 500 implemented by the platform and language agnostic MDTM 406 of FIG. 4 in accordance with an exemplary embodiment. As illustrated in the FIG. 5, the architecture 500 may include a mainframe data base 502, a replication tool 504 (i.e., for configuring mainframe DB2), a local message queue (MQ) 506 that are operatively connected with a private cloud 508 service (i.e., private cloud Splunk service for processing payments, but the disclosure is not limited thereto).

According to exemplary embodiments, QREP may be configured for DB2 table T107 Table where transaction details may be stored in compressed format. According to exemplary embodiments, QREP configured with below columns to publish only for Inserts U type record, but the disclosure is not limited thereto: Inserts only with UTRF_FMT_TYPE='U' type: *UTRF_PROC_DAY; *UTRF_TXN_ID; *UTRF_FMT_TYPE; *UTRF SEQ_NBR; *UTRF_UTC_BUS_DT; *UTRF CURR_SYS_STS; *UTRF SYS CRE TS; * UTRF_TRAN_AMT; * UTRF_SOURCE; * UTRF_DEP_PAY, etc., but the disclosure is not limited thereto.

According to exemplary embodiments, the private cloud 508 service may include an MQ external dependency service block 510 that is operatively connected to the mainframe database 502, specifically to the local MQ 506 to obtain data from the local MQ 506. According to exemplary embodiments, data from the MQ external dependency service block 510 flows to a get message from MQ block 512 from which the data flows to an XML transformation block 514 for transforming the data into XML format, but the disclosure is not limited thereto. The transformed data from the XML transformation block 514 may flow to a data mapping block 516 for mapping the data and then the mapped data flows to a payload generating block 518. The payload generating block 518 may generate a payload based on the mapped data and uploads to a logging to private cloud block 520 and then to a log drainer service block 522.

For example, according to exemplary embodiments, QREP publishes data to the mainframe local MQ 506; the private cloud 508 service may be a Splunk Java that may run on the private cloud 508. For example, the Splunk Java service may read messages from local MQ 506 using a server connection using SSL (secure sockets layer) for establishing secured links between networked computers disclosed herein and used for authentication. According to exemplary embodiments, the XML transformation block 514 performs XML conversion using a predefined framework. If data is compressed in database column, it would uncompressed. The data mapping block 516 performs data mapping to create user format JSON, but the disclosure is not limited thereto. The payload generating block 518 may create JSON payload using the mapping generated in the data mapping block 516. Logging to private cloud clock may be utilized to log to private cloud console logs. The private cloud 508 service may use a log service drainer block 522 to push messages to a log database 526 (i.e., Splunk, but the disclosure is not limited thereto) via a data bus 524. Data from the log database 526 may be uploaded to a distributed platform dashboard 528

Figure 6:
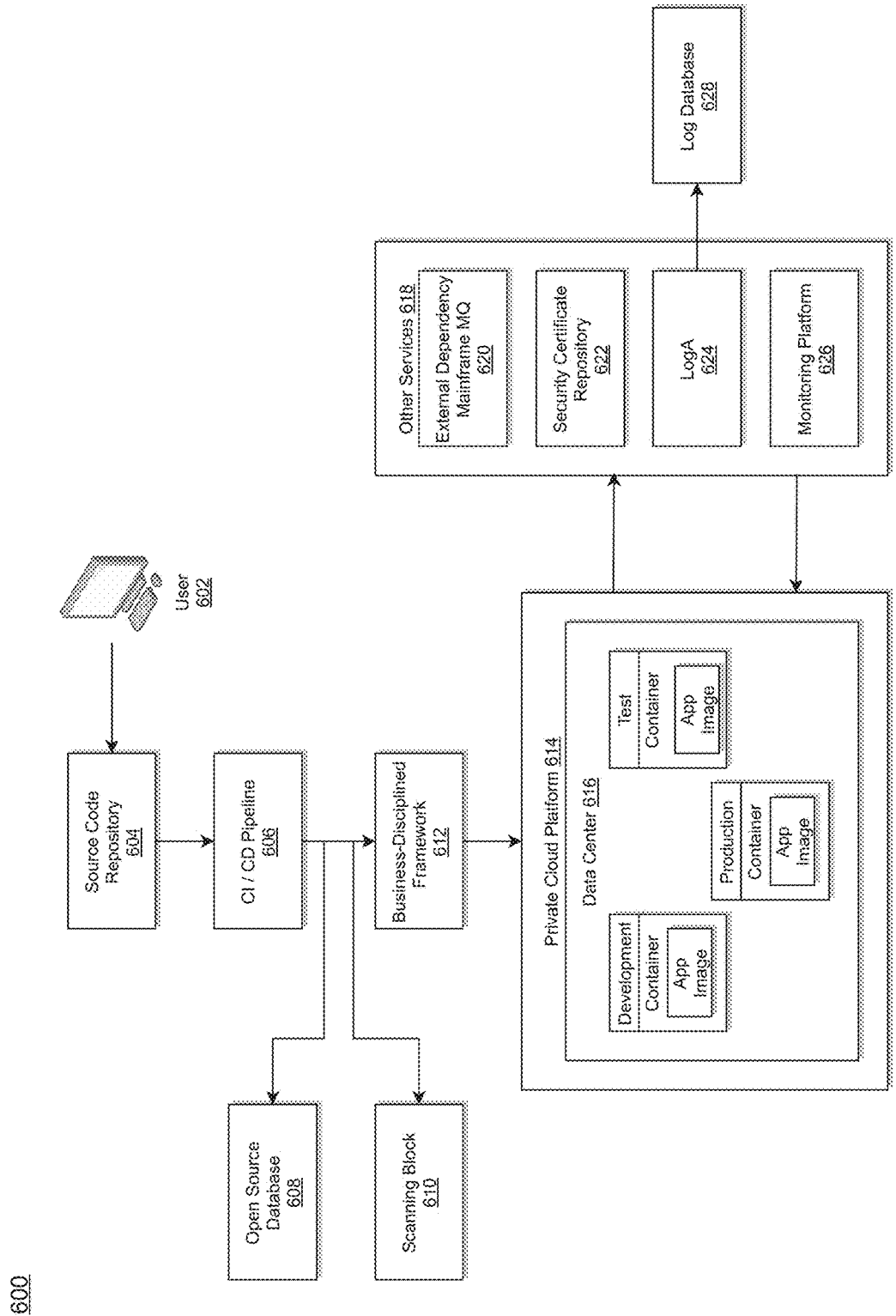
FIG. 6 illustrates an exemplary deployment diagram implemented by the platform and language agnostic modular data transmission module of FIG. 4 in accordance with an exemplary embodiment.

FIG. 6 illustrates an exemplary deployment diagram 600 implemented by the platform and language agnostic MDTM 406 of FIG. 4 in accordance with an exemplary embodiment.

As illustrated in FIG. 6, a user 602 may access a source code repository 604 for obtaining source code data corresponding to one or more transactions data. Data from the source code repository 604 may flow to a CI/CD (continuous integration/continuous deployment pipeline 606. Data from the CI/CD pipeline 606 may flow to a business-disciplined framework 612, an open source database 608, and a scanning block 610. Data from the business-disciplined framework 612 may flow to a private cloud platform 614 that may include a plurality of data centers 616. The private cloud platform 614 may be bi-directionally connected to other services 618 that may include external dependency mainframe MQ 620, security certificate repository 622, log service (e.g., LogA 624), monitoring platform 626, etc., but the disclosure is not limited thereto. Data from LogA 624 may flow to a log database 628.

Referring to FIGS. 4-6, according to exemplary embodiments, the accessing module 414 may be configured to access a mainframe database 502 that stores data relating to one or more transactions onto a table in a compressed format. The implementing module 416b may be configured to implement a replication tool 504 that is configured for the table, and when a row is added to the table or modified in the table, the replication tool 504 may be configured to identify the added or modified row.

According to exemplary embodiments, the publishing module 418 may be configured to publish, by utilizing the replication tool 504, the data associated with the added or modified row onto a mainframe local message queue (MQ) 506. The reading module 420 may be configured to read the published data from the mainframe local MQ 506.

According to exemplary embodiments, the converting module 422 may be configured to convert the data into a configuration file having a predefined file format. The parsing module 424 may be configured to parse the data from the configuration file.

According to exemplary embodiments, the creating module 426 may be configured to create a predefined payload based on the parsed data by utilizing the payload generating block 518 in the private cloud 508 service. The transmitting module 428 may be configured to transmit the predefined payload onto a log database 526 via a data bus 524.

According to a further aspect of the present disclosure, the predefined payload may refer to JSON-formatted text data that is either posted (via an http POST) to a web service when a user creates a resource or returned from a web service (via an http GET) when a user requests a resource (or resources), but the disclosure is not limited thereto. For example, according to exemplary embodiments, the predefined payload may also include a data packet intended for transmission.

According to exemplary embodiments, the mainframe database 502 may be a set of relational databases that enable creation of declarative data models corresponding to the one or more transactions, wherein the declarative data models are accessible via queries.

According to exemplary embodiments, in publishing the transaction details data onto the mainframe local MQ 506, the writing module 430 may be configured to write required columns to the mainframe local MQ 506 in response to the added or modified row. The configuring module 438 may configure the replication tool 504 and the mainframe local MQ 506 in a manner such that writing the required columns does not impact performance of the mainframe database 502 as the replication tool 504 works against logs only.

According to exemplary embodiments, the converting module 422 may be configured to convert the data into an XML file format by utilizing the XML transformation block 514, but the disclosure is not limited thereto. According to exemplary embodiments, the data may correspond to transaction details data associated with the one or more transactions, but the disclosure is not limited thereto. According to exemplary embodiments, the transaction details data may include payments data associated with the one or more transactions, but the disclosure is not limited thereto.

According to exemplary embodiments, in creating the predefined payload, the implementing module 416 may be configured to implement data mapping algorithm to create user format JSON; and the creating module 426 may be configured to create JSON payload utilizing the data mapping algorithm, but the disclosure is not limited thereto.

According to exemplary embodiments, in transmitting the predefined payload onto the log database 526, 628, the logging module 434 may be configured to log onto a private cloud application platform by utilizing the logging to private cloud block 520. The deploying module 436 may be configured to deploy the JSON payload onto the private cloud 508. The transmitting module 428 may be configured to transmit, by utilizing the log service drainer (i.e., log drainer service block 522), the JSON payload from the private cloud 508 to the log database 526 via the data bus 524 for consuming by the distributed platform dashboard 528. The cloud application platform disclosed herein is not limited to a private application platform and the cloud is not limited to a private cloud. According to an exemplary embodiment, the cloud application platform may also be a public cloud application platform for deploying the JSON payload onto a public cloud, but the disclosure is not limited thereto.

Figure 7B:
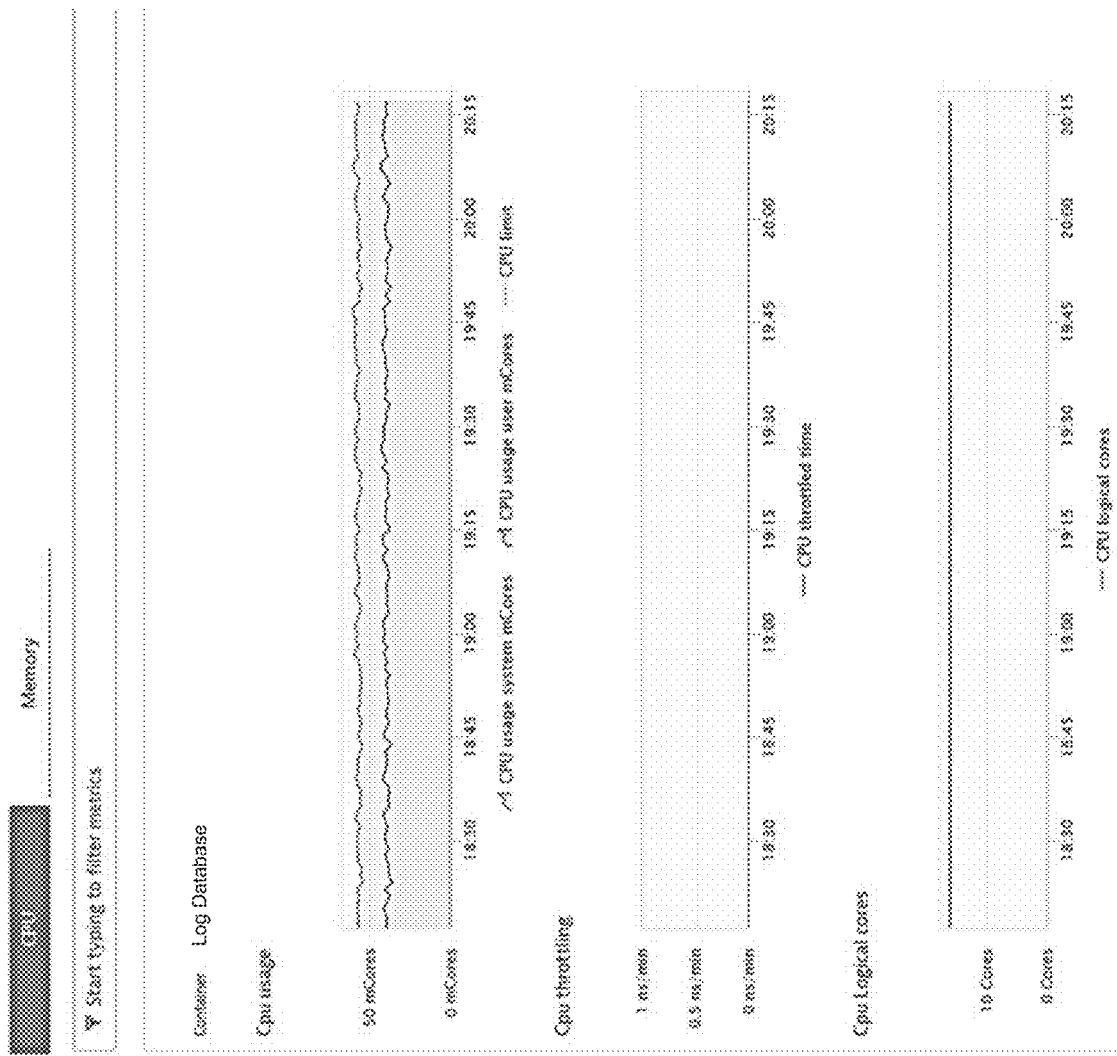
Figure 7C:
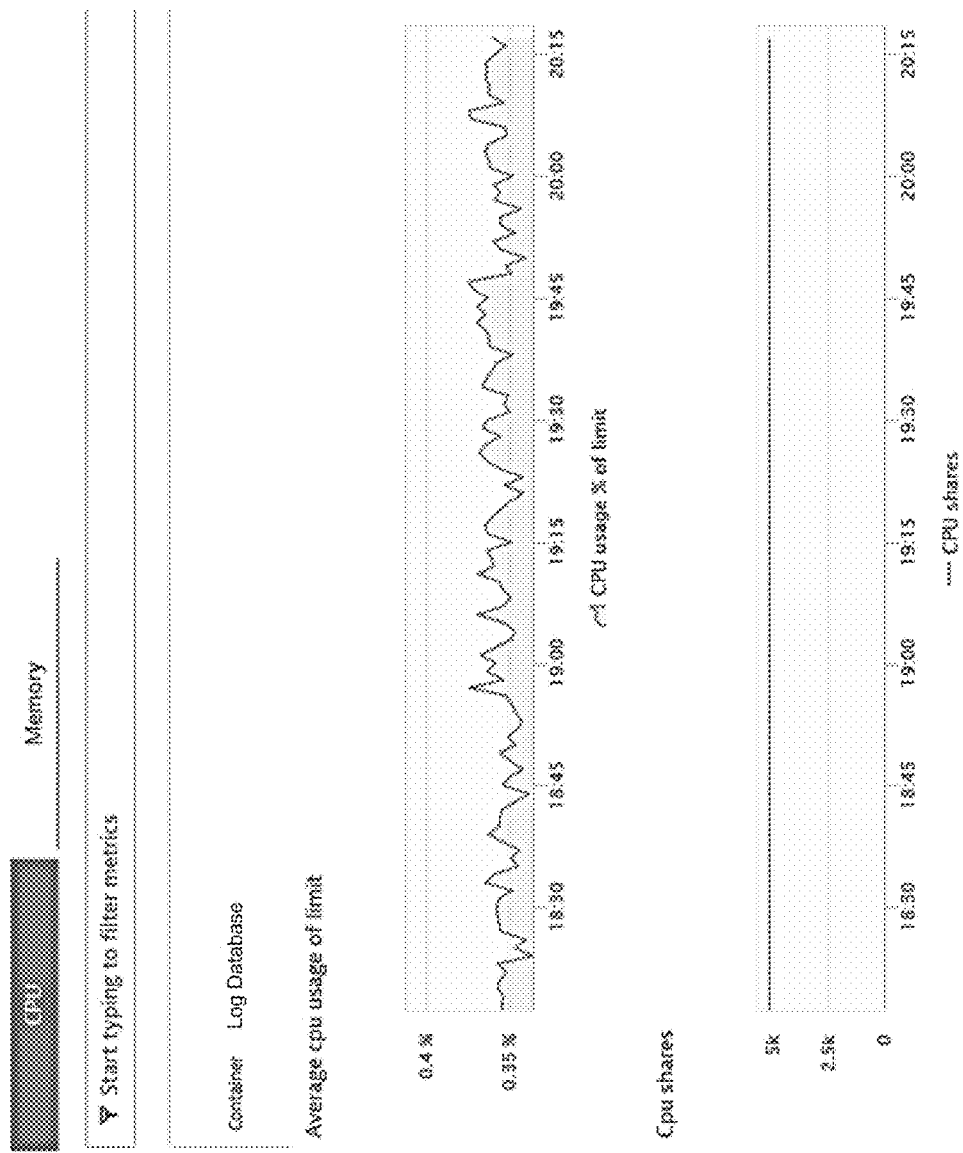

According to exemplary embodiments, the creating module 426 may be configured to create real-time graphs based on the JSON payload obtained from the log database 526. The GUI 440 may be utilized to display the real-time graphs onto a display (i.e. the monitoring screen 700 as illustrated in FIGS. 7A, 7B, and 7C). For example, FIGS. 7A, 7B, and 7C, in combination illustrate an exemplary monitoring screen 700 implemented by the platform and language agnostic MDTM 406 of FIG. 4 in accordance with an exemplary embodiment.

According to exemplary embodiments, the creating module 426 may be configured to create log analytics data to monitor throughput of transactions journey from start to complete of the one or more transactions in real time (see, e.g., FIGS. 7A, 7B, and 7C)

According to exemplary embodiments, the MDTM 406 may be configured to analyze the log analytics data; generate alerts data based on analyzing the log analytics data; and transmit the alters data to a user computing device (e.g., computing device 408(1)-408(n)) for taking remedial actions in correspondence with the alters data. According to exemplary embodiments, the alerts data may include data related to important transactions data to be utilized for making informed financial decisions, but the disclosure is not limited thereto. For example, alerts data displayed on the user computing device may notify the user of key business/financial events that the user cannot afford to miss, thereby helping the user quickly making informed business/financial decisions.

Figure 8:
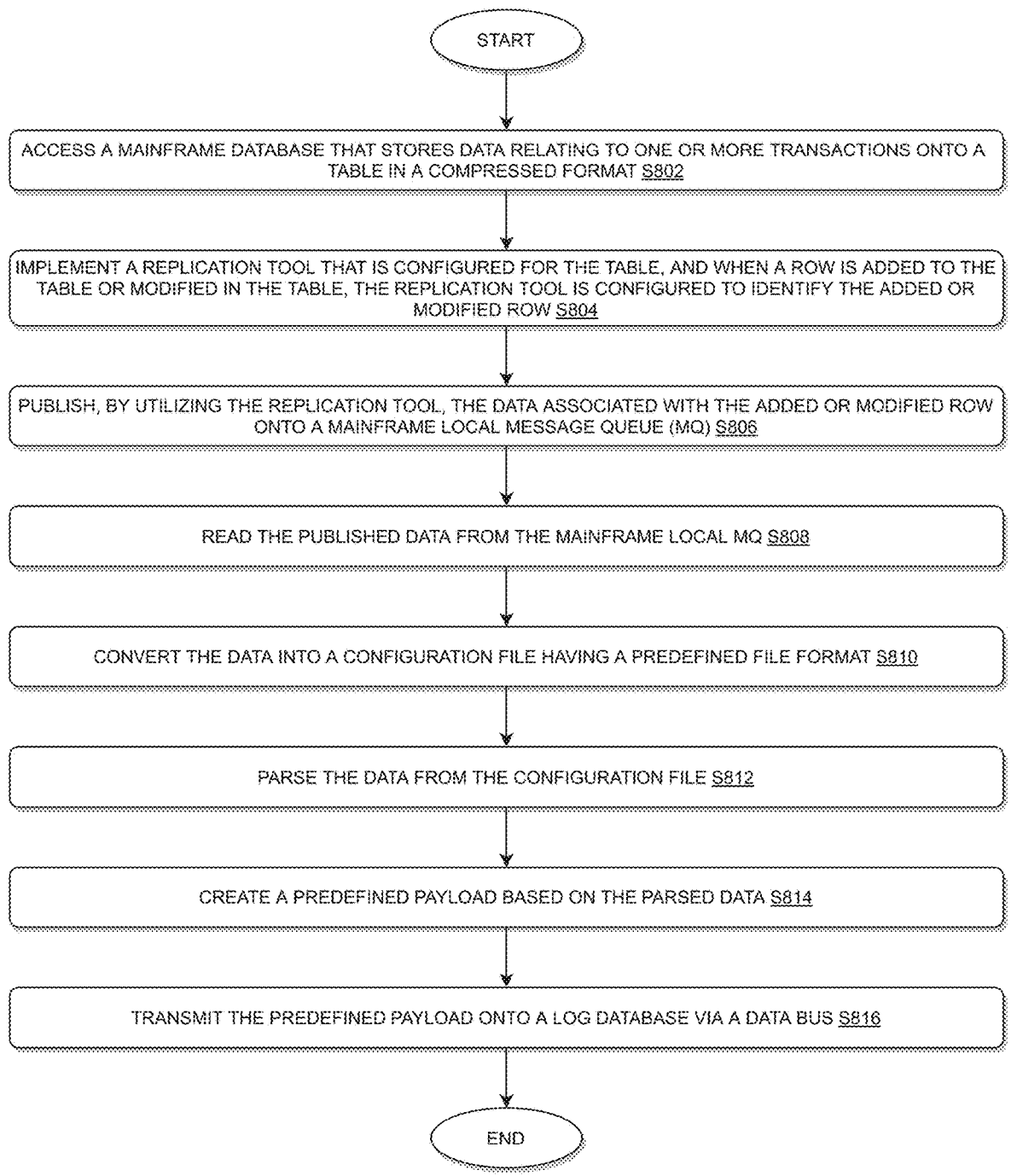
FIG. 8 illustrates a flow chart for implementing a platform and language agnostic modular data transmission module for transmitting near real-time data from mainframe onto a distributed environment without compromising on performance on mainframe in accordance with an exemplary embodiment.

FIG. 8 illustrates a flow chart of a process 800 for implementing a platform and language agnostic modular data transmission module for transmitting near real-time data from mainframe onto a distributed environment without compromising on performance on mainframe in accordance with an exemplary embodiment. It will be appreciated that the illustrated process 800 and associated steps may be performed in a different order, with illustrated steps omitted, with additional steps added, or with a combination of reordered, combined, omitted, or additional steps.

As illustrated in FIG. 8, at step S802, the process 800 may include accessing a mainframe database that stores data relating to one or more transactions onto a table in a compressed format. According to exemplary embodiments, the data may correspond to transaction details data associated with the one or more transactions, but the disclosure is not limited thereto. According to exemplary embodiments, the transaction details data may include payments data associated with the one or more transactions, but the disclosure is not limited thereto.

At step S804, the process 800 may include implementing a replication tool that is configured for the table, and when a row is added to the table or modified in the table, the replication tool is configured to identify the added or modified row.

At step S806, the process 800 may include publishing, by utilizing the replication tool, the data associated with the added or modified row onto a mainframe local MQ.

At step S808, the process 800 may include reading the published data from the mainframe local MQ.

At step S810, the process 800 may include converting the data into a configuration file having a predefined file format.

At step S812, the process 800 may include parsing the data from the configuration file;

At step S814, the process 800 may include creating a predefined payload based on the parsed data; and At step S816, the process 800 may include transmitting the predefined payload onto a log database via a data bus.

According to exemplary embodiments, in publishing the transaction details data onto the mainframe local MQ, the process 800 may further include: writing required columns to the mainframe local MQ in response to the added or modified row; and configuring the replication tool and the mainframe local MQ in a manner such that writing the required columns does not impact performance of mainframe database as the replication tool works against logs only.

According to exemplary embodiments, the process 800 may further include converting the data into an XML (Extensible Markup Language) file format, but the disclosure is not limited thereto.

According to exemplary embodiments, in creating the predefined payload, the process 800 may further include implementing data mapping algorithm to create user format JSON; and creating JSON payload utilizing the data mapping algorithm, but the disclosure is not limited thereto.

According to exemplary embodiments, in transmitting the predefined payload onto the log database, the process 800 may further include logging onto a private cloud application platform; deploying the JSON payload onto the private cloud; and transmitting, by utilizing a log service drainer, the JSON payload from the private cloud to the log database via a data bus for consuming by a distributed platform.

According to exemplary embodiments, the process 800 may further include creating real-time graphs based on the JSON payload obtained from the log database; and displaying the real-time graphs onto a display.

According to exemplary embodiments, the process 800 may further include creating log analytics data to monitor throughput of transactions journey from start to complete of the one or more transactions in real time.

According to exemplary embodiments, the process 800 may further include analyzing the log analytics data; generating alerts data based on analyzing the log analytics data; and transmitting the alters data to a user computing device for taking remedial actions in correspondence with the alters data.

According to exemplary embodiments, the MDTD 402 may include a memory (e.g., a memory 106 as illustrated in FIG. 1) which may be a non-transitory computer readable medium that may be configured to store instructions for implementing an MDTM 406 for data transmission as disclosed herein. The MDTD 402 may also include a medium reader (e.g., a medium reader 112 as illustrated in FIG. 1) which may be configured to read any one or more sets of instructions, e.g., software, from any of the memories described herein. The instructions, when executed by a processor embedded within the MDTM 406, 506 or within the MIDTD 402, may be used to perform one or more of the methods and processes as described herein. In a particular embodiment, the instructions may reside completely, or at least partially, within the memory 106, the medium reader 112, and/or the processor 104 (see FIG. 1) during execution by the MDTD 402.

According to exemplary embodiments, the instructions, when executed, may cause a processor embedded within the MDTM 406 or the MDTD 402 to perform the following: accessing a mainframe database that stores data relating to one or more transactions onto a table in a compressed format; implementing a replication tool that is configured for the table, and when a row is added to the table or modified in the table, the replication tool is configured to identify the added or modified row; publishing, by utilizing the replication tool, the data associated with the added or modified row onto a mainframe local message queue (MQ); reading the published data from the mainframe local MQ; converting the data into a configuration file having a predefined file format; parsing the data from the configuration file; creating a predefined payload based on the parsed data; and transmitting the predefined payload onto a log database via a data bus. The processor may be the same or similar to the processor 104 as illustrated in FIG. 1 or the processor embedded within MDTD 202, MDTD 302, MDTD 402, and MDTM 406.

According to exemplary embodiments, in publishing the transaction details data onto the mainframe local MQ, the instructions, when executed, may cause the processor 104 to perform the following: writing required columns to the mainframe local MQ in response to the added or modified row; and configuring the replication tool and the mainframe local MQ in a manner such that writing the required columns does not impact performance of mainframe database as the replication tool works against logs only.

According to exemplary embodiments, the instructions, when executed, may cause the processor 104 to perform the following: converting the data into an XML (Extensible Markup Language) file format, but the disclosure is not limited thereto.

According to exemplary embodiments, in creating the predefined payload, the instructions, when executed, may cause the processor 104 to perform the following: implementing data mapping algorithm to create user format JSON; and creating JSON payload utilizing the data mapping algorithm, but the disclosure is not limited thereto.

According to exemplary embodiments, in transmitting the predefined payload onto the log database, the instructions, when executed, may cause the processor 104 to perform the following: logging onto a private cloud application platform; deploying the JSON payload onto the private cloud; and transmitting, by utilizing a log service drainer, the JSON payload from the private cloud to the log database via a data bus for consuming by a distributed platform.

According to exemplary embodiments, the instructions, when executed, may cause the processor 104 to perform the following: creating real-time graphs based on the JSON payload obtained from the log database; and displaying the real-time graphs onto a display.

According to exemplary embodiments, the instructions, when executed, may cause the processor 104 to perform the following: creating log analytics data to monitor throughput of transactions journey from start to complete of the one or more transactions in real time.

According to exemplary embodiments, the instructions, when executed, may cause the processor 104 to perform the following: analyzing the log analytics data; generating alerts data based on analyzing the log analytics data; and transmitting the alters data to a user computing device for taking remedial actions in correspondence with the alters data.

According to exemplary embodiments as disclosed above in FIGS. 1-8, technical improvements effected by the instant disclosure may include a platform for implementing a platform and language agnostic modular data transmission module for transmitting near real-time data from mainframe onto a distributed environment without compromising on performance on mainframe, but the disclosure is not limited thereto.

For example, according to exemplary embodiments as disclosed above in FIGS. 1-8, technical improvements effected by the instant disclosure may include a platform that may also provide optimized processes of implementing a platform and language agnostic modular data transmission module that is configured to: provide a real-time dashboard monitor that provides throughput details and product level breakups of transactions data; provide no impact to performance on mainframe as Q replication (i.e., QREP: a high performance log capture/transaction-replay replication technology) works against logs; allow retention of data on a log database for many days compared to mainframe; require no login to mainframe thereby not exposing the application for performance metrics purpose; allow services to be run on cloud thereby eliminating internal data storage requirements and improving storage capacities of internal systems; provide scalability and reusability of data across multiple line of businesses (LOBs); provide rich data graphics compared to mainframe; allow near real-time data transmission (i.e., less than a second, but the disclosure is not limited thereto) without impacting system performance; in a case when service is down, configure the QREP in a manner to stop writing to message queue (MQ) to avoid MQ full; decouple of data with presentation layer thereby allowing quicker time of market as changes can be pushed in distributed platforms quicker than mainframe, etc., but the disclosure is not limited thereto.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for data transmission by utilizing one or more processors along with allocated memory, the method comprising:
   implementing, by at least one processor, a modular data transmission module that includes an accessing module, an implementing module, a publishing module, a converting module, a parsing module, a creating module, and a transmitting module;
   accessing, by calling the accessing module by a first application programming interface (API), a database that stores data relating to one or more transactions;
   implementing, by calling the implementing module by a second API, a replication tool that is configured for a table within the database, and when a row is added to the table or modified in the table, the replication tool is configured to identify the added or modified row;
   publishing, by utilizing the replication tool and by calling the publishing module by a third API, the data associated with the added or modified row onto a local message queue (MQ);
   converting, by calling the converting module by a fourth API, the data into a configuration file having a predefined file format;
   parsing, by calling the parsing module by a fifth API, the data from the configuration file;
   creating, by calling the creating module by a sixth API, a predefined payload based on the parsed data; and
   transmitting, by calling the transmitting module by a seventh API, the predefined payload onto a log database via a data bus and transmitting real-time data from a mainframe onto a distributed environment;
   retaining of data on the log database for certain days compared to mainframe resulting no login to mainframe and not exposing an application for performance metrics purpose,
   wherein the local MQ is a mainframe local MQ, and in publishing the transaction details data onto the mainframe local MQ, the method further comprising:
   writing required columns to the mainframe local MQ in response to the added or modified row; and
   configuring the replication tool and the mainframe local MQ in a manner such that writing the required columns does not impact performance of mainframe database as the replication tool works against logs only.

2. The method according to claim 1, wherein the database is a set of mainframe relational databases, and the method further comprising:
   creating declarative data models corresponding to the one or more transactions by utilizing the set of mainframe relational databases; and
   accessing the declarative data models via queries.

3. The method according to claim 1, further comprising:
   converting the data into an XML (Extensible Markup Language) file format.

4. The method according to claim 1, wherein the data corresponds to transaction details data associated with the one or more transactions.

5. The method according to claim 1, wherein the transaction details data includes data associated with the one or more financial transactions.

6. The method according to claim 1, wherein in creating the predefined payload, the method further comprising:
   implementing data mapping algorithm to create user format JSON (Java Script Object Notation); and
   creating JSON payload utilizing the data mapping algorithm.

7. The method according to claim 6, wherein in transmitting the predefined payload onto the log database, the method further comprising:
   logging onto a cloud application platform;
   deploying the JSON payload onto the cloud; and
   transmitting, by utilizing a log service drainer, the JSON payload from the cloud to the log database via a data bus for consuming by a distributed platform.

8. The method according to claim 7, further comprising:
   creating real-time graphs based on the JSON payload obtained from the log database; and
   displaying the real-time graphs onto a display.

9. The method according to claim 7, further comprising:
   creating log analytics data to monitor throughput of transactions journey from start to complete of the one or more transactions in real time.

10. The method according to claim 7, further comprising:
    analyzing the log analytics data;
    generating alerts data based on analyzing the log analytics data;
    transmitting the alters data to a user computing device; and
    implementing remedial actions in correspondence with the alters data by utilizing the user computer device.

11. A system for data transmission, the system comprising:
a processor; and
a memory operatively connected to the processor via a communication interface, the memory storing computer readable instructions, when executed, causes the processor to:
implement a modular data transmission module that includes an accessing module, an implementing module, a publishing module, a converting module, a parsing module, a creating module, and a transmitting module;
access, by calling the accessing module by a first application programming interface (API), a database that stores data relating to one or more transactions;
implement, by calling the implementing module by a second API, a replication tool that is configured for a table within the database, and when a row is added to the table or modified in the table, the replication tool is configured to identify the added or modified row;
publish, by utilizing the replication tool and by calling the publishing module by a third API, the data associated with the added or modified row onto a local message queue (MQ);
convert, by calling the converting module by a fourth API, the data into a configuration file having a predefined file format;
parse, by calling the parsing module by a fifth API, the data from the configuration file;
create, by calling the creating module by a sixth API, a predefined payload based on the parsed data; and
transmit, by calling the transmitting module by a seventh API, the predefined payload onto a log database via a data bus and transmitting real-time data from a mainframe onto a distributed environment;
retain data on the log database for certain days compared to mainframe resulting no login to mainframe and not exposing an application for performance metrics purpose,
wherein the local MQ is a mainframe local MQ, and in publishing the transaction details data onto the mainframe local MQ, wherein the processor is further configured to:
write required columns to the mainframe local MQ in response to the added or modified row; and
configure the replication tool and the mainframe local MQ in a manner such that writing the required columns does not impact performance of mainframe database as the replication tool works against logs only.

12. The system according to claim 11, wherein in creating the predefined payload, the processor is further configured to:
implement data mapping algorithm to create user format JSON (Java Script Object Notation); and
create JSON payload utilizing the data mapping algorithm.

13. The system according to claim 12, wherein in transmitting the predefined payload onto the log database, the processor is further configured to:
log onto a cloud application platform;
deploy the JSON payload onto the cloud; and
transmit, by utilizing a log service drainer, the JSON payload from the cloud to the log database via a data bus for consuming by a distributed platform.

14. The system according to claim 13, wherein the processor is further configured to:
create real-time graphs based on the JSON payload obtained from the log database;
display the real-time graphs onto a display.

15. The system according to claim 13, wherein the processor is further configured to:
create log analytics data to monitor throughput of transactions journey from start to complete of the one or more transactions in real time.

16. The system according to claim 13, wherein the processor is further configured to:
analyze the log analytics data;
generate alerts data based on analyzing the log analytics data;
transmit the alters data to a user computing device; and
implement remedial actions in correspondence with the alters data by utilizing the user computer device.

17. The system according to claim 11, wherein the processor is further configured to:
convert the data into an XML (Extensible Markup Language) file format.

18. A non-transitory computer readable medium configured to store instructions for data transmission, wherein, when executed, the instructions cause a processor to perform the following:
implementing, by at least one processor, a modular data transmission module that includes an accessing module, an implementing module, a publishing module, a converting module, a parsing module, a creating module, and a transmitting module;
accessing, by calling the accessing module by a first application programming interface (API), a database that stores data relating to one or more transactions;
implementing, by calling the implementing module by a second API, a replication tool that is configured for a table within the database, and when a row is added to the table or modified in the table, the replication tool is configured to identify the added or modified row;
publishing, by utilizing the replication tool and by calling the publishing module by a third API, the data associated with the added or modified row onto a local message queue (MQ);
converting, by calling the converting module by a fourth API, the data into a configuration file having a predefined file format;
parsing, by calling the parsing module by a fifth API, the data from the configuration file;
creating, by calling the creating module by a sixth API, a predefined payload based on the parsed data; and
transmitting, by calling the transmitting module by a seventh API, the predefined payload onto a log database via a data bus and transmitting real-time data from a mainframe onto a distributed environment;
retaining of data on the log database for certain days compared to mainframe resulting no login to mainframe and not exposing an application for performance metrics purpose,
wherein the local MQ is a mainframe local MQ, and in publishing the transaction details data onto the mainframe local MQ, the instructions, when executed, further cause the processor to perform the following:
writing required columns to the mainframe local MQ in response to the added or modified row; and
configuring the replication tool and the mainframe local MQ in a manner such that writing the required columns does not impact performance of mainframe database as the replication tool works against logs only.

19. The non-transitory computer readable medium according to claim 18, wherein in creating the predefined payload, the instructions, when executed, cause the processor to further perform the following:
- implementing data mapping algorithm to create user format JSON (Java Script Object Notation); and
- creating JSON payload utilizing the data mapping algorithm.

20. The non-transitory computer readable medium according to claim 19, wherein in transmitting the predefined payload onto the log database, the instructions, when executed, cause the processor to further perform the following:
- logging onto a cloud application platform;
- deploying the JSON payload onto the cloud; and
- transmitting, by utilizing a log service drainer, the JSON payload from the cloud to the log database via a data bus for consuming by a distributed platform.

* * * * *